United States Patent
Thubert et al.

(10) Patent No.: US 11,399,387 B2
(45) Date of Patent: Jul. 26, 2022

(54) SYSTEM AND METHOD FOR SCHEDULING FOR REDUNDANT LAYER 2 CONTROL MESSAGES

(71) Applicant: Cisco Technology, Inc., San Jose, CA (US)

(72) Inventors: Pascal Thubert, Roquefort les Pins (FR); Patrick Wetterwald, Mouans Sartoux (FR); Eric Levy-Abegnoli, Valbonne (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 323 days.

(21) Appl. No.: 16/560,852

(22) Filed: Sep. 4, 2019

(65) Prior Publication Data

US 2021/0068137 A1     Mar. 4, 2021

(51) Int. Cl.
| | |
|---|---|
| *H04W 72/12* | (2009.01) |
| *H04B 7/14* | (2006.01) |
| *H04W 40/24* | (2009.01) |
| *H04B 17/318* | (2015.01) |
| *H04W 92/20* | (2009.01) |
| *H04W 84/12* | (2009.01) |

(52) U.S. Cl.
CPC .......... *H04W 72/1284* (2013.01); *H04B 7/14* (2013.01); *H04B 17/318* (2015.01); *H04W 40/24* (2013.01); *H04W 84/12* (2013.01); *H04W 92/20* (2013.01)

(58) Field of Classification Search
CPC . H04W 72/1284; H04W 84/12; H04W 40/24; H04B 17/318; H04B 7/14
See application file for complete search history.

(56) References Cited

U.S. PATENT DOCUMENTS

| | | |
|---|---|---|
| 8,369,257 B2 | 2/2013 | Chu et al. |
| 9,363,752 B2 | 6/2016 | Jafarian et al. |
| 2015/0117369 A1* | 4/2015 | Merlin .............. H04W 72/0446 370/329 |
| 2016/0360545 A1* | 12/2016 | Khandekar ....... H04W 72/0433 |
| 2017/0339680 A1 | 11/2017 | Jia et al. |

(Continued)

OTHER PUBLICATIONS

Nurchis, Maddalena, Boris Bellalta; Target Wake Time: Scheduled access in IEEE 802.11 ax WLANs; (Submitted on Apr. 20, 2018 (v1), last revised Dec. 24, 2018 (this version, v2)); arXiv.org arxiv:1804.0//17[cs.NI] (14 pps).

(Continued)

*Primary Examiner* — Ayanah S George

(74) *Attorney, Agent, or Firm* — Merchant & Gould P.C.

(57) ABSTRACT

System and method for scheduling for redundant layer 2 control messages may be provided. A control message for a Station (STA) may be received at a secondary Access Point (AP) from a primary AP. The primary AP and the secondary AP may both cover the STA. The primary AP may send the control message to both the secondary AP and the STA. The secondary AP may listen for an acknowledgement from the STA to the primary AP confirming receipt of the control message. The secondary AP may resend the control message to the STA in response to no acknowledgement from the STA to the primary AP confirming the receipt of the control message.

20 Claims, 13 Drawing Sheets

(56) References Cited

U.S. PATENT DOCUMENTS

2018/0027429 A1* 1/2018 Li .................. H04W 24/02
 455/426.1
2020/0275306 A1* 8/2020 Shah ................ G06F 13/368

OTHER PUBLICATIONS

Thubert, P. et al.; Reliable and Available Wireless Technologies draft-thubert-raw-technologies-02; tools.ietf.org; Jun. 19, 2019, (34 pps).

* cited by examiner

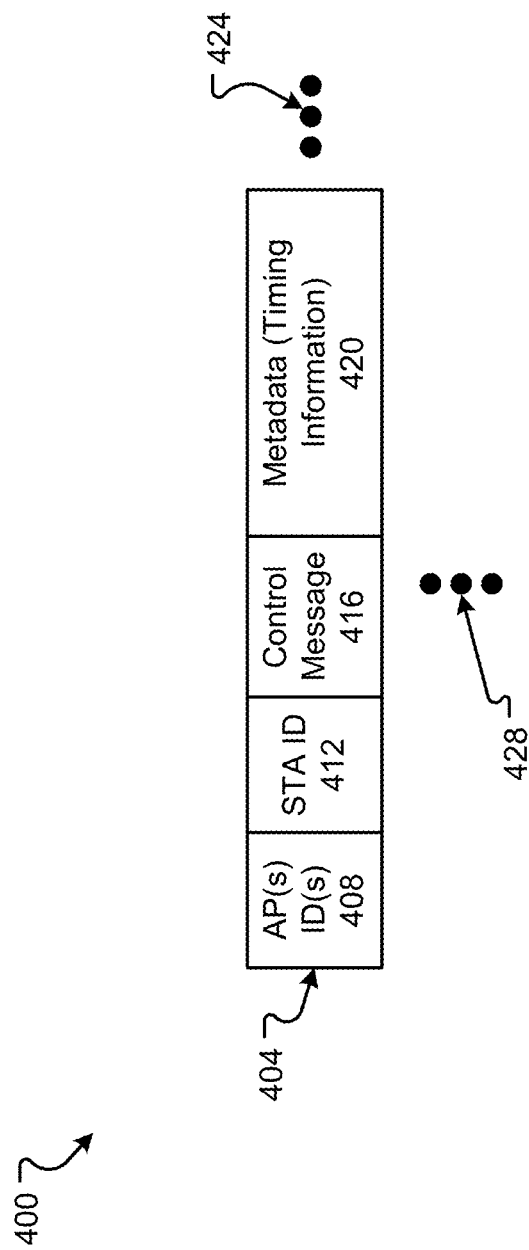

US 11,399,387 B2

SYSTEM AND METHOD FOR SCHEDULING FOR REDUNDANT LAYER 2 CONTROL MESSAGES

TECHNICAL FIELD

An exemplary aspect is directed toward communications systems. More specifically an exemplary aspect is directed toward IEEE (Institute of Electrical and Electronics Engineers) 802.11 wireless communications systems.

BACKGROUND

Wireless systems employ processes to manage the radio resources of the wireless devices to optimize receipt and transmission of data. To ensure receipt of data, Reliable and Available Wireless (RAW) was introduced to provide more robust transmission and receipt of data for various applications, for example, automation applications, safety systems, etc. RAW requires that all packets are received within a bounded delay or those packets are deemed lost. In RAW, the loss ratio is maintained at a very low threshold, which creates difficulties. For example, the low threshold can require replication and elimination to increase the diversity of communication paths over the various radio hops.

In at least some situations, multiple Access Points (APs) (the wireless receiver/transmitter that sends and receives data from a Station (STA), which can be various devices, for example, a mobile device) can receive the client traffic from a STA and then use a redundant path to carry multiple copies. This type of protocol makes it appear that the replication of packets had happened at the source.

In other situations, a secondary AP may promiscuously listen to the STA and relay the received packets to the primary AP over a wired connection to the primary AP. These protocols and processes ensure that the Internet Protocol (IP) data traffic is protected, at least over the radio hop. However, these protocols and processes fail to protect the layer 2 (L2) control messages from the AP to the STA.

If a STA fails to receive these L2 control messages (e.g., Target Wait Time (TWT) information, a beacon that contains TWT Information Elements (IEs), a trigger message, etc.), then the STA cannot send the next packet to the AP because the STA would be unaware of the scheduled Transmission Opportunity (TXOP). As a result, even if the data traffic is protected by redundant paths, the data traffic may still be blocked because the L2 controls messages, such as TWT, failed to be received by the STA.

These above scenarios present challenges in radio resource scheduling.

SUMMARY

Aspects herein can comprise a first Basic Service Set (BSS) having a primary access point (AP) that can wirelessly connect with a station (STA). The primary AP can then determine a secondary AP also in communication with the STA. Then, the primary AP can send a control message to the STA and relay the control message to the secondary AP. To ensure the STA receives the control message, the secondary AP can receive, from the primary AP, the control message for the STA and resend the control message to the STA.

BRIEF DESCRIPTION OF THE FIGURES

FIG. 4 illustrates data structure that may be received, stored, retrieved, managed, etc., in accordance with aspects of the current disclosure;

Figure 1:
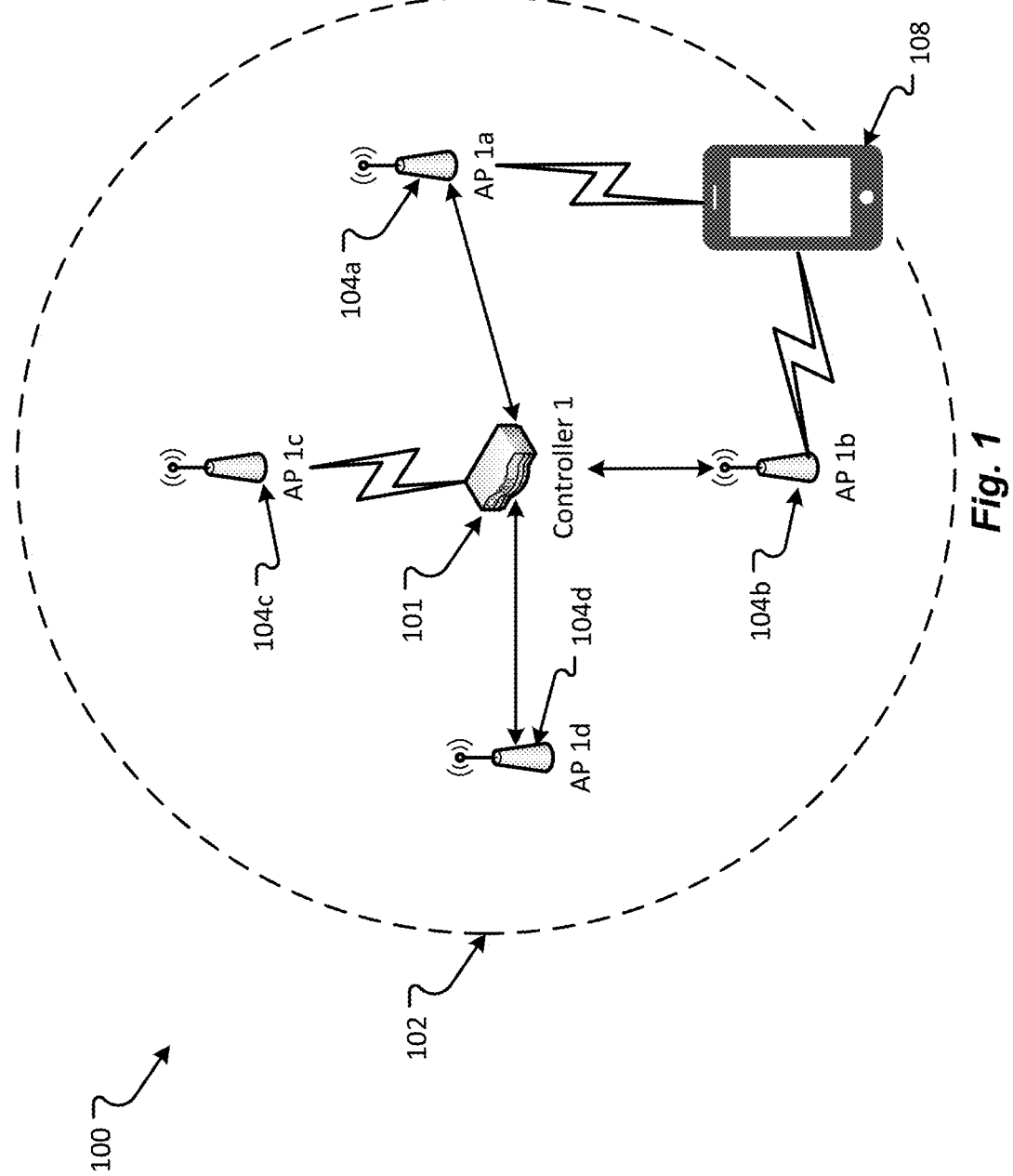
FIG. 1 illustrates an environment having two APs providing control messages in accordance with aspects of the current disclosure.

In the drawings, like numerals can refer to like components. A letter following the numeral indicates another instance of the same type of component. Like components can share the description of that component. When referring to a component without the letter following the numeral, all components having that numeral indicator may share that description.

DETAILED DESCRIPTION

Overview

Aspects herein can enable RAW. RAW can help enable DetNet over Wireless Local Area Networks (WLANs). The aspects ensure redundancy by including at least two (2) APs, in an environment, that are capable of serving at least one STA. A first AP functions as a primary AP and a second AP functions as a secondary AP. Both APs can communicate with STAs in a same area (e.g., a same room) and may receive the traffic from the STA, for example, per Duocast or Virtual AP Protocol (VAPP).

The primary AP can send a L2 control message, for example, a TWT response, to a STA. The primary AP may then wait for an indication (e.g., an Acknowledgement (ACK) signal) of receipt of the L2 control message. However, in at least some situations there may not be an indication from the STA that the L2 control message was well received. Further, the failure to receive the L2 control message can mean a loss for the deterministic flow.

In the aspects herein, the primary AP can also provide the L2 control message to a secondary AP that covers the same room. The L2 control message can contain a scheduled indication of when the STA is expected to send the acknowledgement or the data. With this information, the secondary AP knows when to listen for a critical (e.g., DetNet or RAW) packet. In at least some configurations, the L2 control message includes metadata about when the secondary AP is to send the copy of the L2 control message over the air.

The timing of when the secondary AP is to send the message can depends on the message. For example, if the L2 control message is a TWT request, then the secondary AP can issue a second copy at any time. In contrast, if the L2 control message is a TWT IE to be placed in a beacon, then the redundant L2 control message is not time sensitive but requires storing the IE information and sending that information later in beacons sent by the secondary AP that may merge various IEs from various sources. Yet, if the L2 control message is a trigger message then the redundant L2 control message is very time sensitive. In this situation, the secondary AP can send a copy of the trigger message, at a minimal Inter-Frame Spacing IFS), after receiving the original trigger message from the primary AP over the air. If the STA. If the STA fails to receive the trigger message, the secondary STA sends the redundant message at a particular time or at a particular delay, after receiving the L2 control message over the wire from the primary AP. This particular time or particular delay can be indicated in the L2 control message sent over the wire from the primary AP.

After the L2 control message(s) are safely received, the STA can send the scheduled packet. The secondary AP knows the schedule for transmission from the received L2 control message(s). Thus, based on the schedule, the secondary AP can listen for when and/or where the STA is sending the data packet. The secondary AP can thus receive a copy of the data packet. This copy of the data packet can then be sent to the primary AP.

These devices, systems, processes, etc. will be explained in more detail below.

Aspects herein are generally directed to wireless communications systems that can perform according to one or more wireless communications standards. For example, some aspects may involve wireless communications performed according to Wi-Fi standards developed by the IEEE 802.11, for example, may involve wireless communications performed in accordance with an IEEE 802.11ax. Some aspects may involve wireless communications performed in accordance with other standards, rules, regulations, guidance, etc. Some aspects may additionally or alternatively involve wireless communications according to one or more other wireless communication standards, for example, and without limitation, other IEEE wireless communication standards, such as the IEEE 802.11, IEEE 802.11a, IEEE 802.11b, IEEE 802.11g, IEEE 802.11n, IEEE 802.11u, IEEE 802.11ac, IEEE 802.11ad, IEEE 802.11af, IEEE 802.11 ah, and/or IEEE 802.11ay standards, Wi-Fi Alliance (WFA) wireless communication standards, such as, Wi-Fi, Wi-Fi Direct, Wi-Fi Direct Services, Wireless Gigabit (WiGig), WiGig Display Extension (WDE), WiGig Bus Extension (WBE), WiGig Serial Extension (WSE) standards and/or standards developed by the WFA Neighbor Awareness Networking (NAN) Task Group, Machine-Type Communications (MTC) standards such as those embodied in 3GPP Technical Report (TR) 23.887, 3GPP Technical Specification (TS) 22.368, and/or 3GPP TS 23.682, and/or Near-Field Communication (NFC) standards such as standards developed by the NFC Forum, including any predecessors, revisions, progeny, and/or variants of any of the above.

Likewise, some aspects may involve wireless communications performed according to one or more broadband wireless communication standards, for example, 3rd Generation Partnership Project (3GPP), 3GPP Long Term Evolution (LTE), and/or 3GPP LTE-Advanced (LTE-A) technologies and/or standards. Additional examples of broadband wireless communication technologies/standards may include Global System for Mobile Communications (GSM)/Enhanced Data Rates for GSM Evolution (EDGE), Universal Mobile Telecommunications System (UMTS)/High Speed Packet Access (HSPA), and/or GSM with General Packet Radio Service (GPRS) system (GSM/GPRS), IEEE 802.16 wireless broadband standards such as IEEE 802.16m and/or IEEE 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1.times.RTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards.

Example Embodiments

FIG. 1 illustrates an example of an operating environment associated with aspects herein. The WLAN environment 100 may comprise a basic service set (BSS) 102 that may include a master station or controller 101, one or more APs 104*a*-104*d*, and one or more devices or stations (STAs) 108. The master station 101 may be an AP using the IEEE 802.11 protocol(s) to transmit and receive. Hereinafter, the term AP will be used to identify the controller 101, but the configurations may not be limited to the AP performing the functions described herein as a separate controller may also perform the functions.

Figure 7:
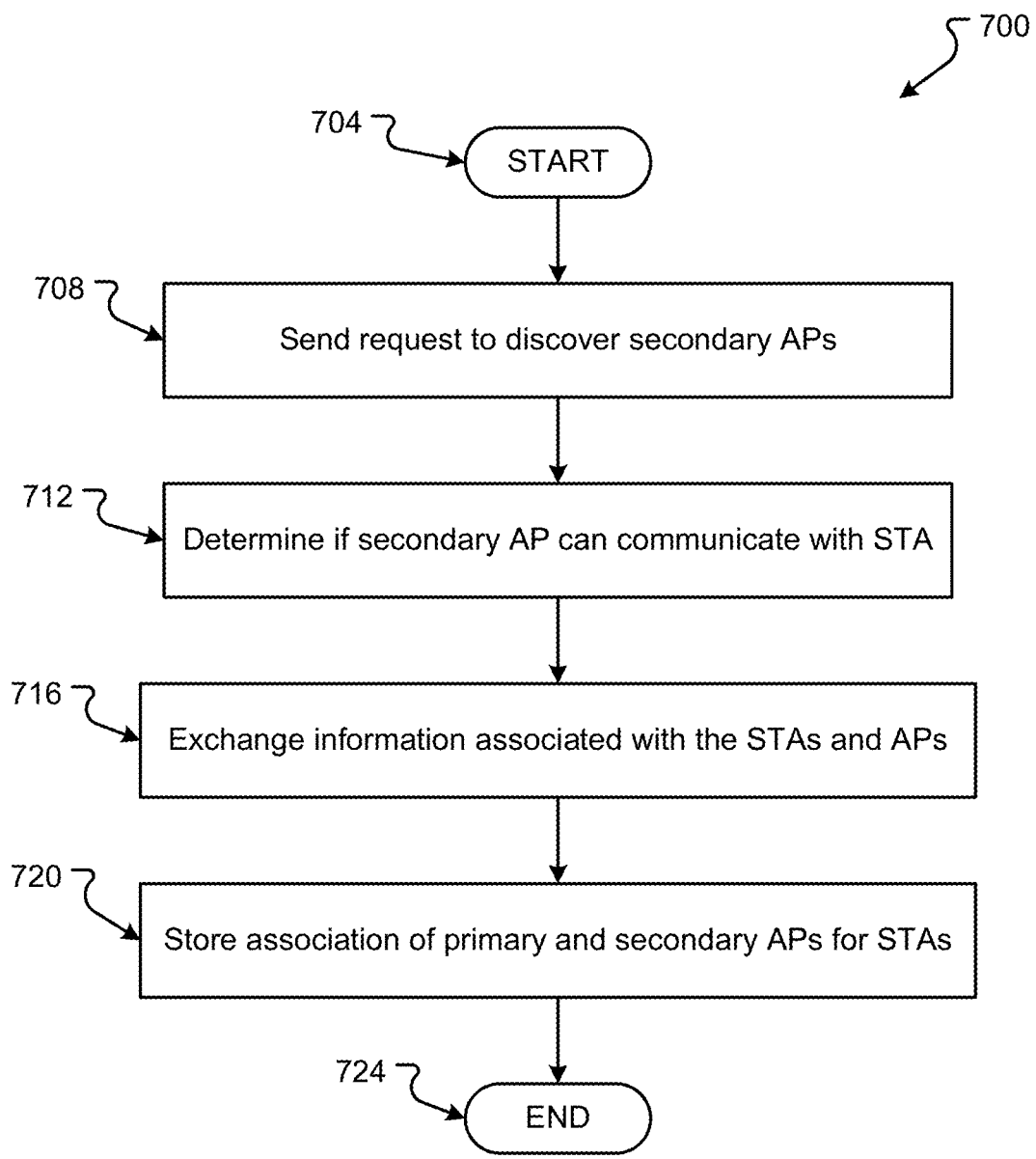
FIG. 7 illustrates a process for associating primary and secondary APs, in accordance with aspects of the current disclosure.

The AP 104 may be a base station and may use other communications protocols as well as the IEEE 802.11 protocol. The IEEE 802.11 protocol may include using OFDMA, Time Division Multiple Access (TDMA), and/or code division multiple access (CDMA). The IEEE 802.11 protocol may include a multiple access technique. For example, the IEEE 802.11 protocol may include Space-Division Multiple Access (SDMA) and/or Multiple-User Multiple-Input Multiple-Output (MU-MIMO). An example configuration of the APs 104 and/or controllers 101 may be as shown in FIG. 7.

The STAs 108 may include one or more High-Efficiency Wireless (HEW) (as illustrated in, e.g., the IEEE 802.11ax standard) STAs and/or one or more legacy (as illustrated in, e.g., the IEEE 802.11n/ac standards) STAs. The STAs 108 may be a wireless devices, for example, a cellular telephone, a smart telephone, a handheld wireless device, wireless glasses, a wireless watch, a wireless personal device, a tablet, or another device that may be transmitting and receiving using an IEEE 802.11 protocol. In the operating environment, an AP 104 may generally manage access to the wireless medium in the WLAN for the STA 108.

Within the environment 100 including the BSS 102, one or more STAs 108 may associate and/or communicate with the AP 104 to join the WLAN. Joining the WLAN may enable STAs 108 to wirelessly communicate with each other via an AP 104, with each other directly, with the AP 104, or to another network or resource through the AP 104. In some configurations, to send data to a recipient, a sending STA may transmit an Uplink (UL) Physical Layer Convergence Procedure (PLCP) Protocol Data Unit (PPDU) comprising the data, to AP 104, which may then send the data to the recipient STA 108, in a Downlink (DL) PPDU. The PLCP is the physical layer protocol that is used with 802.11 and other standards.

In some configurations, a frame of data transmitted between the STAs 108 or between a STA 108 and the AP 104 may be configurable. For example, a channel used for communication may be divided into subchannels that may be 20 MHz, 40 MHz, or 80 MHz, 160 MHz, 320 MHz of contiguous bandwidth or an 80+80 MHz (160 MHz) of non-contiguous bandwidth. Further, the bandwidth of a subchannel may be incremented into 1 MHz, 1.25 MHz, 2.03 MHz, 2.5 MHz, 5 MHz and 10 MHz bandwidths, or a combination thereof, or another bandwidth division that is less or equal to the available bandwidth may also be used. The bandwidth of the subchannels may be based on a number of active subcarriers. The bandwidth of the sub-channels can be multiples of 26 (e.g., 26, 52, 108, etc.) active subcarriers or tones that are spaced by 20 MHz. In some configurations, the bandwidth of the subchannels is 256 tones spaced by 20 MHz. In other configurations, the subchannels are a multiple of 26 tones or a multiple of 20 MHz. A 20 MHz subchannel may also comprise 256 tones for use with a 256 point Fast Fourier Transform (FFT).

When managing access to the wireless medium in the WLAN 100, the AP 104 may schedule medium access, for the sending STA 108, during a UL time interval, during which the AP 104 may refrain from transmitting over the wireless medium. The UL time interval may comprise a portion of a Transmit Opportunity (TXOP) owned by AP 104.

At a given point in time, multiple STAs, in the WLAN 100, may wish to send data. In some configurations, rather than scheduling medium access for STAs 108 in different respective UL time intervals, the AP 104 may schedule medium access for STAs 108 to support UL MU transmission techniques, according to which multiple STAs 108 may transmit UL MU PPDUs to the AP 104 simultaneously during a given UL time interval. For example, by using UL MU OFDMA techniques during a given UL time interval, multiple STAs 108 may transmit UL MU PPDUs to the AP 104 via different respective OFDMA Resource Units (RUs) allocated by the AP 104. In another example, by using UL MU-MIMO techniques during a given UL time interval, multiple STAs 108 may transmit UL MU PPDUs to the AP 104 via different respective spatial streams allocated by the AP 104.

To manage access, the AP 104 may transmit a HEW master-sync transmission, which may be a Trigger Frame (TF) or a control and schedule transmission, at the beginning of the control period. The AP 104 may transmit a time duration of the TXOP and sub-channel information. During the HEW control period, HEW STAs 108 may communicate with the AP 104 in accordance with a non-contention based multiple access technique, such as OFDMA or MU-MIMO. This HEW technique is unlike conventional WLAN communications in which devices communicate in accordance with a contention-based communication technique, rather than a multiple access technique. During the HEW control period, the AP 104 may communicate with stations 108 using one or more control frames, and the STAs 108 may operate on a sub-channel smaller than the operating range of the AP 104.

During the HEW master-sync transmission, the STAs 108 may contend for the wireless medium with the legacy devices 108 being excluded from contending for the wireless medium during the HEW master-sync transmission. The TF used during this HEW master-sync transmission may indicate an UL-MU-MIMO and/or UL OFDMA control period. The multiple-access technique used during the control period may be a scheduled OFDMA technique, or alternatively, may be a TDMA technique, a Frequency Division Multiple Access (FDMA) technique, or a SDMA technique.

Similarly, STAs 108, in the WLAN 100, may need to receive data. Again, rather than scheduling medium access for STAs 108 in different respective DL time intervals, the AP 104 may schedule medium access for STAs 108 to support DL MU transmission techniques, according to which multiple STAs 108 may receive DL MU PPDUs from the AP 104 simultaneously during a given DL time interval. For example, by using DL MU OFDMA techniques during a given UL time interval, multiple STAs 108 may receive DL MU PPDUs from the AP 104 via different respective OFDMA RUs allocated by the AP 104. In another example, by using DL MU-MIMO techniques during a given DL time interval, multiple STAs 108 may receive DL MU PPDUs from the AP 104 via different respective spatial streams allocated by the AP 104.

To manage access, the AP 104 may transmit a HEW master-sync transmission, which may be a TF or a control and schedule reception, at the beginning of the control period. The AP 104 may transmit a time duration of the Receive Opportunity (RXOP) and sub-channel information. During the HEW control period, HEW STAs 108 may communicate with the AP 104 in accordance with a non-contention based multiple access technique, such as OFDMA or MU-MIMO. During the HEW control period, the AP 104 may communicate with stations 108 using one or more control frames, and the STAs 108 may operate on a sub-channel smaller than the operating range of the AP 104.

During the HEW master-sync transmission, the STAs 108 may contend for the wireless medium with the legacy devices 108 being excluded from contending for the wireless medium during the HEW master-sync transmission. The TF used during this HEW master-sync transmission may indicate an UL-MU-MIMO and/or UL OFDMA control period. The multiple-access technique used during the control period may be a scheduled OFDMA technique, or alternatively, may be a TDMA technique, FDMA technique, or a SDMA technique.

The one or more APs 104*a*, 104*b*, 104*c*, 104*d* can function as primary and secondary controllers, as shown in FIG. 1. Hereinafter, AP 104*a* may be referred to as the primary AP, and AP 104*b* may be referred to as the secondary AP. The primary AP 104*a* and secondary AP 104*b* may work together to ensure that the LT control messages mentioned above (e.g., the trigger frames, beacons, etc.) are sent to and received by STA 108 to coordinate uplink and downlink transmissions to the station 108.

Figure 2:
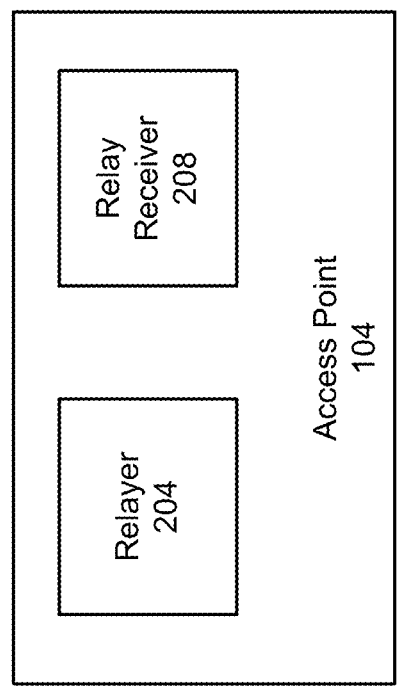
FIG. 2 illustrates an access point in accordance with aspects of the current disclosure.

An embodiment of an AP 104 may be as shown in FIG. 2. The AP 104 can be any type of software, hardware, or combination of hardware and software. An example of at least some of the components of an AP 104 may be as described in conjunction with FIG. 7. In at least some configurations herein, the AP 104 may include one or more of, but is not limited to, a relayer 204 and a relay receiver 208, as shown in FIG. 2.

The relayer component 204 can relay LT control messages received from the primary AP 104*a* to a STA 108. The relayer 204 can receive these LT control messages, from the relay receiver 208, which can receive the L2 control messages either directly from the primary AP 104*a* or through the controller 101. Further, the relayer 204 of the primary AP 104*a* can send L2 control messages to the secondary AP 104*b*. Thus, the relayer 204 can identify the secondary AP 104b in the current configuration and form messages to be send to that identified secondary AP 104b. Primary control messages may be as described in conjunction with data structure 404 of FIG. 4. Signals received or relayed by the secondary AP 104b, by the relayer 204, may be as described in conjunction with FIG. 3.

The relay receiver 208 can receive relay messages 208 from the primary AP 104. Thus, the relayer 204 can send relay messages from the primary AP 104a to the secondary AP 104b, while the relay receiver 208 can receive those messages from a primary AP 104b. These received relay messages may be sent, by the relay receiver 208, to the STA 108. The received relay messages may contain data as described in conjunction with data structure 404 of FIG. 4. The signals sent may be as described in conjunction with FIG. 3.

In embodiments, each AP may contain a relayer 204 and a relay receiver 208. However, depending on the role assumed by the access point 104, either the relayer 204 or the relay receiver 208 is not functional or does not conduct activities. For example, the primary AP 104a may execute the relayer 204, but may not receive control messages from the relay receiver 208. However, any type of communications or responses from the secondary AP 104b to the primary AP 104 may be received by a relay receiver 208, in some situations. Similarly, if the AP 104b is serving as the secondary AP, the relay receiver 208 may be functioning and the relayer 204 may not be functioning. In still other situations, and AP 104 can function as the primary AP 104a for some STAs 108 and the secondary AP 104b for other STAs. In these situations, the AP 104 may execute both the relayer 204 and the relay receiver 208 contemporaneously but for different communication sessions for different STAs 108.

Figure 3A:
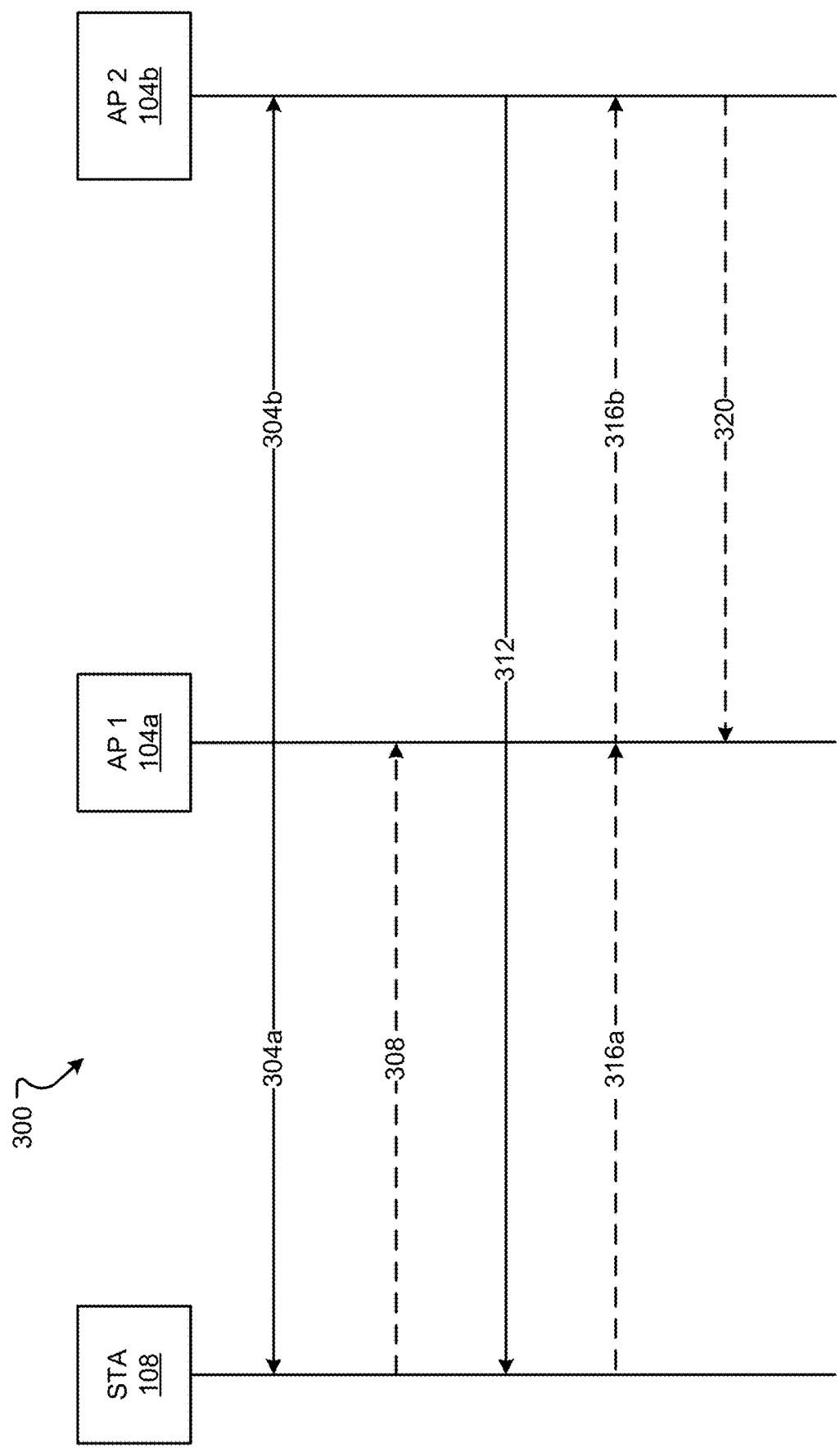
FIG. 3A illustrates a signaling process in accordance with aspects of the current disclosure.
Figure 3B:
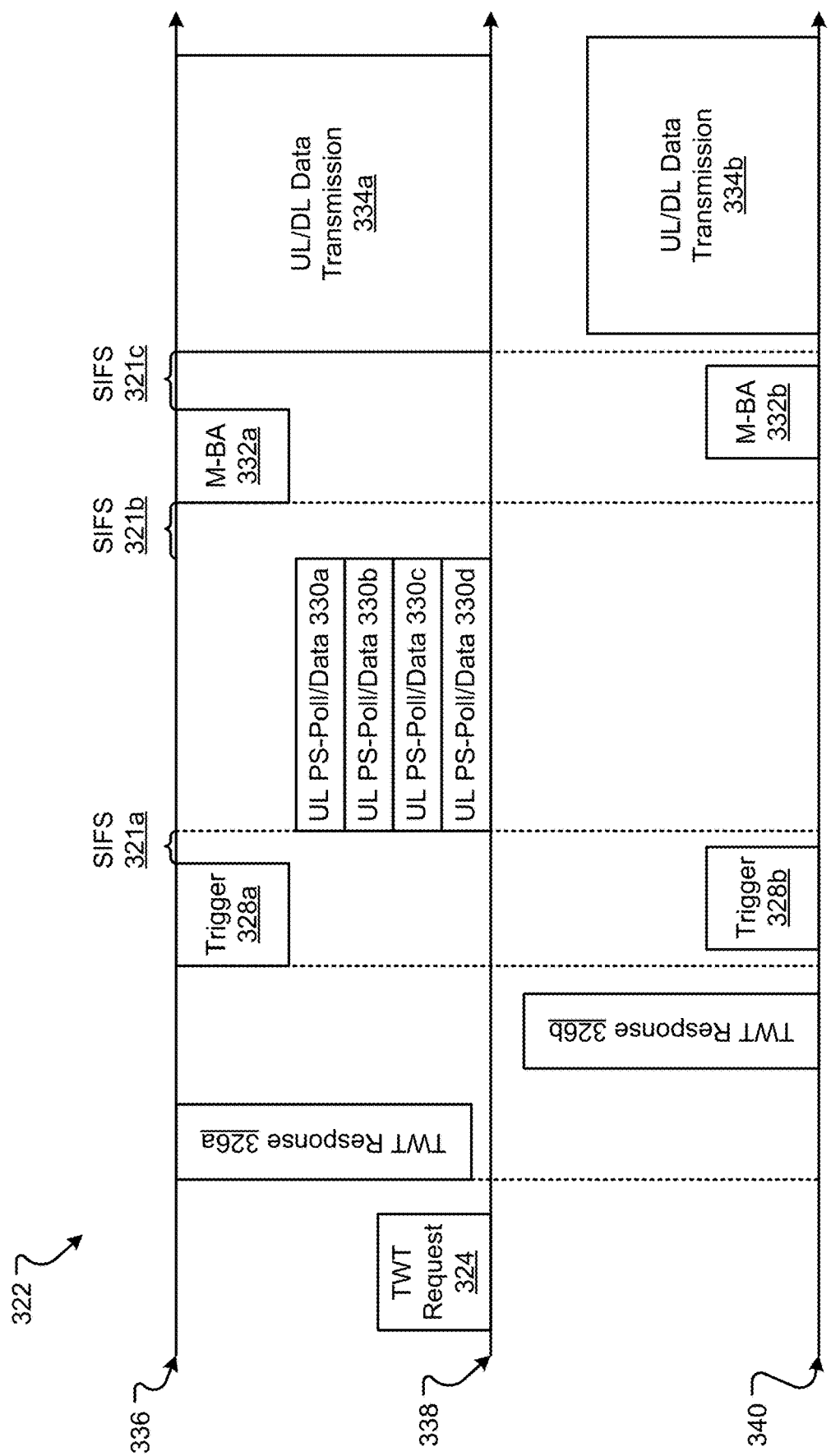
FIG. 3B illustrates another signaling process in accordance with aspects of the current disclosure.

An embodiment of a signaling processes 300 for relaying L2 control messages may be as shown in FIGS. 3A and 3B. The L2 control messages or communications between the station 108, the primary access point 104a, and the secondary access point 104b may be shown in FIGS. 3A and 3B. In a first situation, the primary AP 104a may send control message 304a to the station 108. The relayer 204 may also send the message 304b (which includes the same content as message 304a) to the secondary access point 104b. Signal 304b may be the same wireless transmission as 304a but in the form of a different message sent over the connection between the first AP 104a and the secondary AP 104b. The primary access point 104a may send the signal 304b directly to the secondary access point 104b either through a wired connection, through the router 101, or by directed wireless transmission.

If the station 108 receives the LT control message 304a, a second signal 308 may be sent, by the STA 108, to the primary access point 104a. The signal 308 is optional as the station may not send the signal 308 if it does not receive the LT control message, in signal 304a. However, if the signal 304a is received, the station 108 sends the signal 308 to the primary access point 104a to acknowledge receipt of the message 304a.

In some situations, access point 2 104b may listen for the response signal 308 sent form the station 108. If no response message is received at AP 104b, then at some predetermined time, at some predetermined delay, or by some predetermined event, the secondary AP 104b may resend the LT control message 312 to the station 108. Thus, the secondary AP 104b can function to ensure that the LT control messages are sent to the station even when the station 108 fails to receive the message from the primary AP 304a. In other situations, AP2 104b does not wait for a response message 308. Rather, AP 2 104b repeats the L2 control message 304a, in signal 312. The STA 108 may then receive two of the control messages, in signal 304a and signal 312, but can ignore the second control message 312 as a duplicate.

The station 108 may then respond with another acknowledgement signal 316a that may be sent to the primary AP 108a and/or the secondary 108b. These signals, 316a and 316b, may be received by the primary AP 104a and the secondary AP 104b. The secondary AP 104b can then send the acknowledgement signal 316b in signal 320 back to the primary AP 104a. If the primary AP 140a has already received the acknowledgement signal 316a, the primary AP 104a can ignore signal 320. However, if signal 316a is not received, the primary AP 104a may acknowledge receipt of signal 304a or signal 312 based on the relayed response message 320a. Further, signals 316a, 316b can also be UL data sent from the STA 108 to the primary AP 104a but also received at the secondary AP 104b. The secondary AP 104b can then relay the UP data to the primary AP 104a in signal 320.

Another signaling process 322 may be as shown in FIG. 3B. Signalling process 322 shows message transmissions from the primary AP 104a on line 336, from the STA 108 on line 338, and from the secondary AP 104b on line 340. The signals in FIG. 3B show how different types of control messages may be relayed depending on the time sensitivity of those signals.

A STA 108 can send a Target Wake Time (TWT) request 324. The TWT request 324 can be received by the primary AP 104a. Thereinafter, the primary AP 104a can respond to the TWT request 324 with a TWT response 326a, which can provide a time for a RXOP or TXOP that may be initiated with a TF 328a that will be sent at a predetermined time after the TWT response 326a. The TWT response 326a can be relayed to the secondary AP 104b. As such, the second AP 104b can resend the TWT response 326b sometime after the TWT response 326a but before the TF 328a. Thus, the secondary AP 104b has some amount of time to send the TWT response 326b and can wait for a signal acknowledgement or simply send the TWT response 326b when able. Further, the TWT response 326b may be scheduled to be sent after the TWT response 326a to ensure no overlap in the signals 326a, 326b, which could cause collisions and other issues.

The trigger frame 328a is more time sensitive as the UL Power Saving (PS)-Poll/Data 330 needs to be send by the various APs 104 at a predetermined time after a Short Inter-Frame Space (SIFS). The primary AP 104 a transmit the trigger 328a and can contemporaneously relay the trigger 328a to the secondary AP 104b. The secondary AP 104b may not wait to transmit the trigger 328b due to the short time constraints. As such, the trigger 328b may be retransmitted quickly after the transmission 328a. If the STA 108 receives both trigger frames 328a and 328b, the second trigger 328b may be ignored.

After a SIFS 321b, the STAs 108 may then send the UL PS-Poll/Data 330a, 330b, 330c, 330d. These frames are acknowledged, by the primary AP 104a, with a Multiple Block Acknowledgement (M-BA) 332a, which may also be relayed to the secondary AP 104b. The secondary AP 104b can send the M-BA 332b after the M-BA 332a in the SIFS 321c. Thereinafter, the UL or DL data may be transmitted by the primary AP 104a or the STA 108, in signal(s) 334a. The primary AP 104a can relay any DL signals to the secondary AP 104b. Likewise, the secondary AP 104b will know the time for transmission and the RU for the UL signals from the STA 108. Thus, the secondary AP 104*b* can listen for the UL transmissions from the STA 108. If the signals 334*a* are DL data, the secondary AP 104*b* may repeat the DL data transmission to the STA 108 at some time after the signal 334*a*, in signal 334*b*. If the signals 334*a* are UL data, the secondary AP 104*b* can wirelessly receive the UL data and relay that data to the primary AP 104*a* wirelessly or over a wired transmission.

It should be noted that the timing of the signals from the second AP 104*b* can be planned or directed by the primary AP 104*a*. Thus, when relaying the signals to the secondary AP 104*b*, the primary AP 104*a* can include metadata in the relayed signal to instruct the secondary AP 104*b* as to how the signals should be repeated. Thus, the timing of the repeated signals 326*b*, 328*b*, 332*b*, etc. may be predetermined to ensure collisions do not occur but that the STA 108 receives the signals from either the primary AP 104*a* and/or the secondary AP 104*b*.

Further, it should be noted that the second AP 104*b* may retransmit the L2 control message in various processes. For example, if the L2 control message is a beacon (e.g., a trigger frame 328*a* or TWT response 326*a* incorporated into a beacon signal), the secondary AP 104*b* can repeat the beacon. However, in other configurations, the secondary AP 104*b* can also incorporate the IEs from the L2 control message in the primary AP's 104*a* beacon into the secondary AP's 104*b* beacon. Then, the second AP 104*b* can send its own beacon, with the additional IEs from the primary AP's 104*a* beacon, without needing to send a separate, repeated beacon from the primary AP 104*a*. Thus, the signaling process 322 can include a beacon announcement, a beacon from the primary AP 104*a*, and then a repeated beacon (or a normal beacon with additional IEs) from the secondary AP 104*b*.

An embodiment of data structures 400 that may be sent, received, stored, or managed by the access points 104 may be as shown in FIG. 4. The data structures 400 can include at least data structure 404, which may include LT control message information. This data structure 404 may include one or more of, but is not limited to, an AP identifier (ID) 408, a STA ID 412, the control message 416, and/or metadata 420. There may be more or fewer fields in data structure 404 as represented by ellipses 424. Further, each various exchange of data between a STA 108 and an AP 104 may have one or more relayed control messages as represented by ellipses 428.

The AP identifier 408 can include any type of identifier of the primary access point 104*a* and/or the secondary access point 104*b*. The AP ID 408 can include a numeric ID, an alphanumeric ID, a globally unique ID (GUID), a MAC address, a URL, etc. This AP ID 408 can uniquely identify the AP 104 amongst other APs either within the BSS 102 or amongst other APs 104 in the environment 100.

The STA ID 412, similar to the AP ID 408, can identify the STA 108 amongst other stations in the BSS 102 or that are communicating with the APs 104. The STA ID 412 can include a numeric ID, an alphanumeric ID, a GUID, a MAC address, a URL, or some other type of identifier that can uniquely identify the STA 108.

The control message 416 includes the message (e.g., the TWT response 326*a*, the trigger 328*a*, the M-BA 332*a*, etc.) needing to be sent to the station 108. In other situations, the control message 416 can include a response from a STA 108 back to an AP 104 (e.g., UL data 334*a*). Regardless, the control message 416 may be timing or other information required by the AP 104*a* or the STA 108 to conduct communications between AP 104*a* and STA 108.

Metadata 420 may include any type of metadata regarding the control message 416. For example, the metadata 420 can include timing information that describes when the control message should be sent by the AP 104*b*, when a response should be expected from the station 108, or other types of timing information. This timing information allows for the secondary AP 104*b* to understand when a message should be relayed to the station 108 or the AP 104*a*. For example, the metadata 420 can indicate that the TWT response 326*b* should not be sent before the completion of TWT response message 326*a*. Other metadata can include the type of control message in the control message field 416, the channel or other resource unit information used for the control message 416, or other types of information.

Figure 5A:
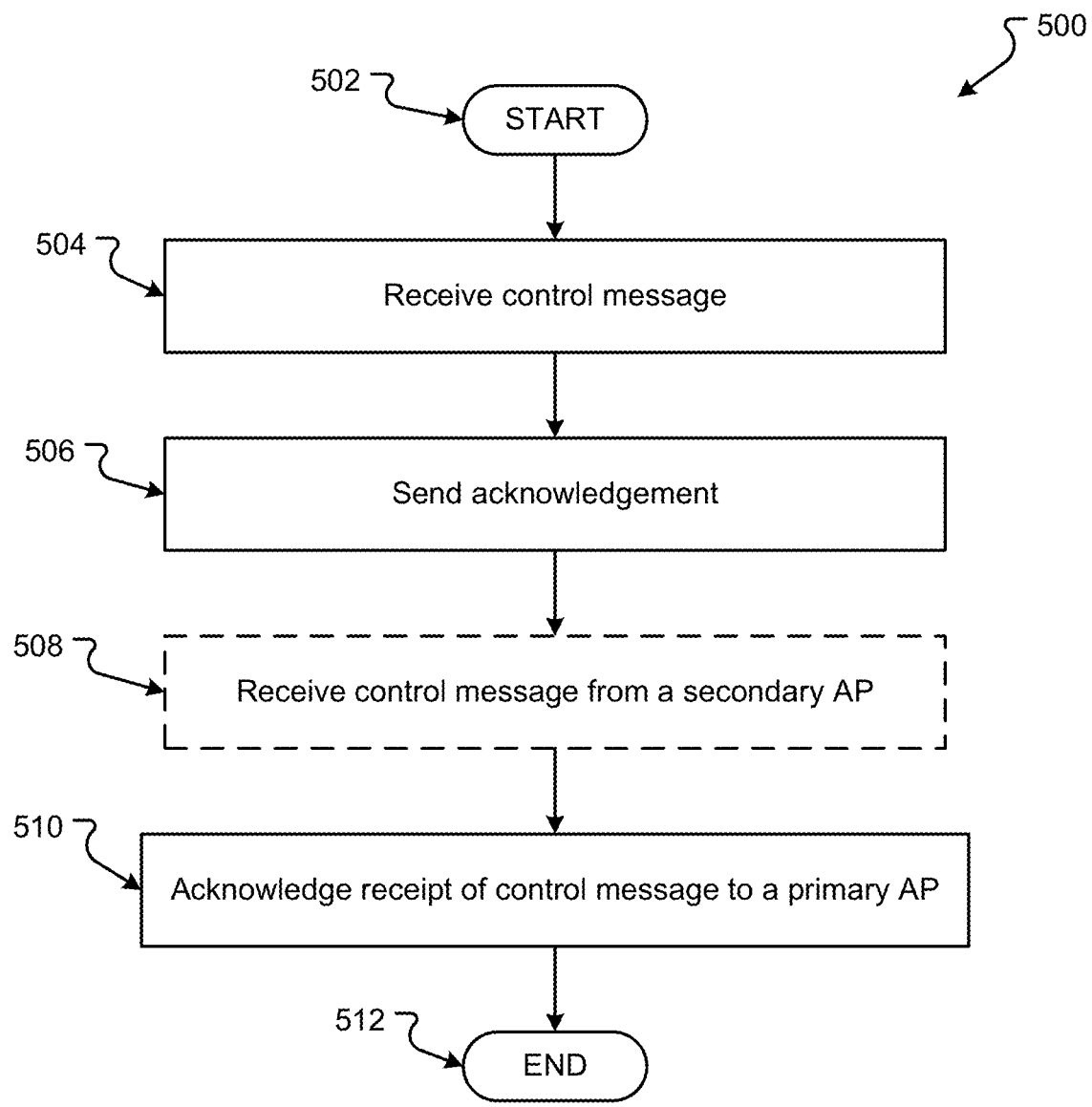
FIG. 5A illustrates a process for managing control messages, as conducted at a STA, in accordance with aspects of the current disclosure.
Figure 5B:
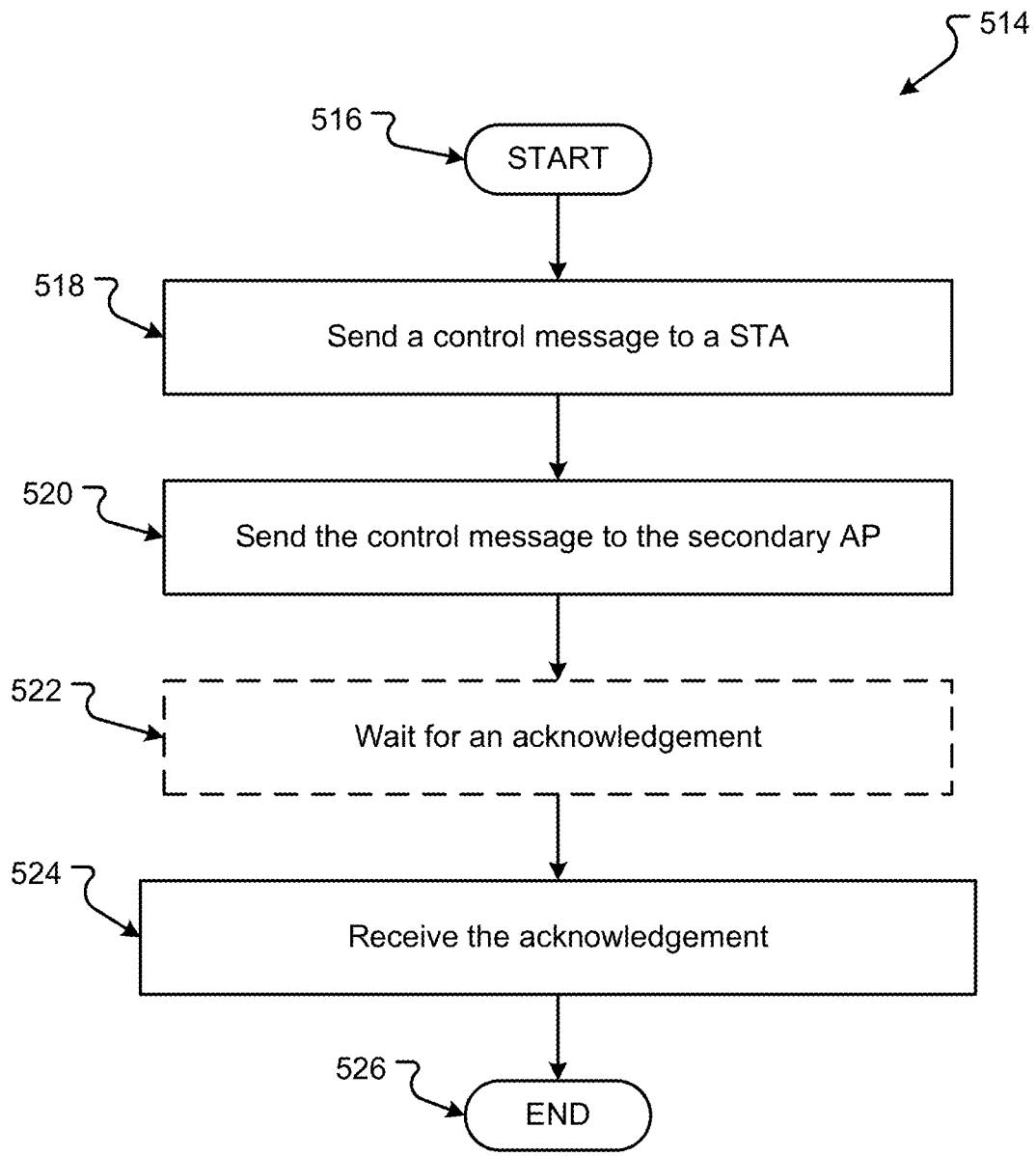
FIG. 5B illustrates a process for managing control messages, as conducted at a primary AP, in accordance with aspects of the current disclosure.
Figure 5C:
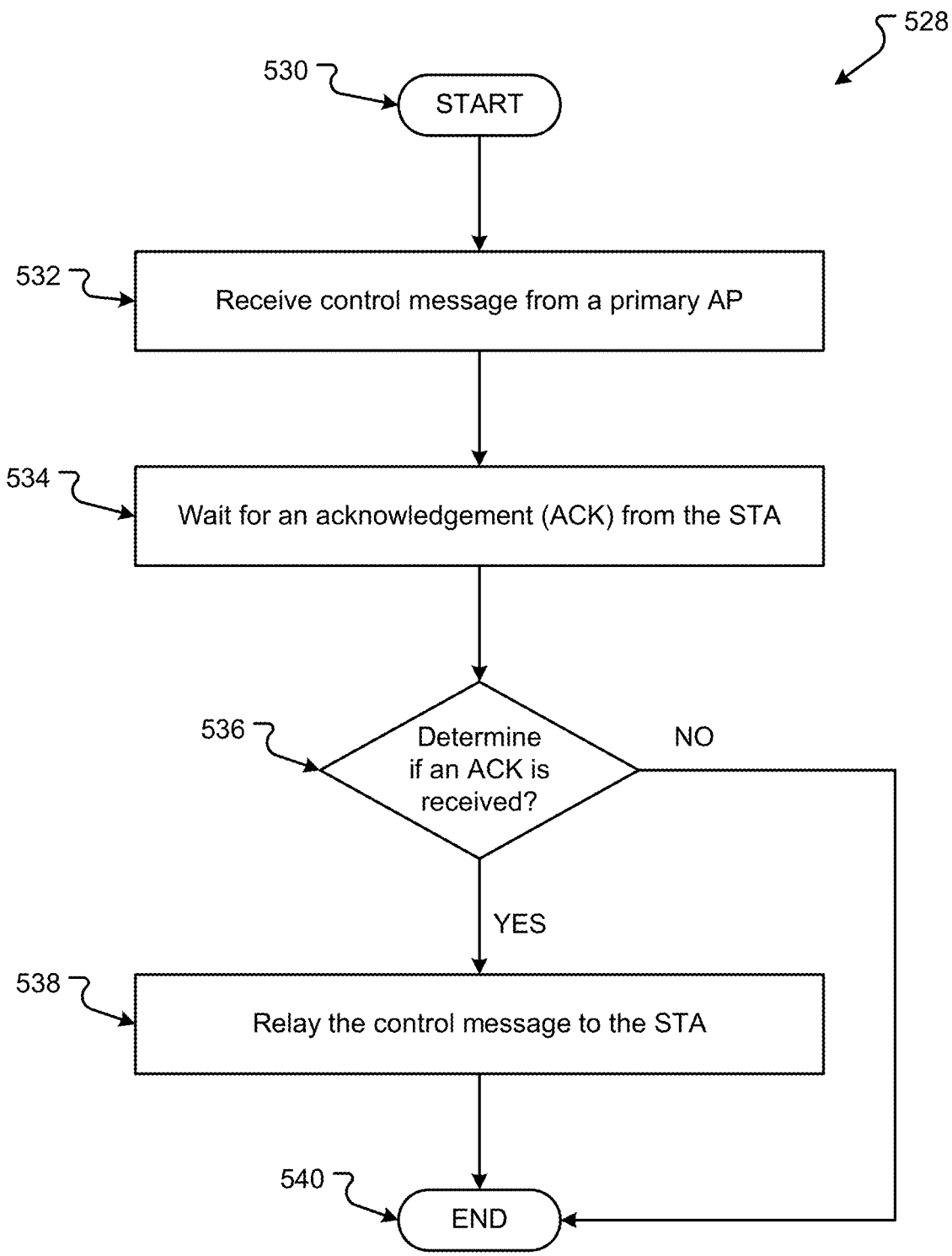
FIG. 5C illustrates a process for managing control messages, as conducted at a secondary AP, in accordance with aspects of the current disclosure.

An embodiment of processes 500, 514, 528 for sending control messages from one or more access points 104*a*, 104*b* to a station 108 may be as described in conjunction with FIG. 5A, FIG. 5B, and FIG. 5C. The methods will be described herein together. Method 500 shown in FIG. 5A may be conducted by the station 108. Generally, the method 500 starts with a start operation 504 and ends with an end operation 512. The method 500 can include more or fewer stages or can arrange the order of the stages differently than those shown in FIG. 5. The method 500 can be executed as a set of computer-executable instructions, executed by a computer system or processing component, and be encoded or stored on a storage medium. Further, the method 500 can be executed by a gate or other hardware device or component in an ASIC, a FPGA, or other type of hardware device. Hereinafter, the method 500 shall be explained with reference to the systems, components, modules, software, data structures, etc. described herein.

Method 514 shown in FIG. 5B may be as conducted by the primary AP 104*a*. Generally, the method 514 starts with a start operation 504 and ends with an end operation 526. The method 514 can include more or fewer stages or can arrange the order of the stages differently than those shown in FIG. 5. The method 514 can be executed as a set of computer-executable instructions, executed by a computer system or processing component, and be encoded or stored on a storage medium. Further, the method 514 can be executed by a gate or other hardware device or component in an ASIC, a FPGA, or other type of hardware device. Hereinafter, the method 514 shall be explained with reference to the systems, components, modules, software, data structures, etc. described herein.

The method 528 as shown in FIG. 5C may be as conducted by the secondary AP 104*b*. Generally, the method 528 starts with a start operation 504 and ends with an end operation 540. The method 528 can include more or fewer stages or can arrange the order of the stages differently than those shown in FIG. 5. The method 528 can be executed as a set of computer-executable instructions, executed by a computer system or processing component, and be encoded or stored on a storage medium. Further, the method 528 can be executed by a gate or other hardware device or component in an ASIC, a FPGA, or other type of hardware device. Hereinafter, the method 528 shall be explained with reference to the systems, components, modules, software, data structures, etc. described herein.

The primary AP 104*a* may send a control message to the station 108, in stage 518. The control message may contain one or more items of information as in data structure 404. This control message may be sent as signal 304*a*.

The control message may also be sent to the secondary AP 104*b*, in stage 520. This second signal 304*b* may be sent to the secondary AP 104*b* and include one or more of the IEs in data structure 404. In at least some configurations, the second signal 304b is sent over a wired connection between APs 104a and 104b, which may use a different communication protocol, e.g., IEEE 802.3. The secondary AP 104b can receive the control messages 304b from a primary AP 104a, in stage 532. Upon receiving this message 404, the secondary AP 104a can extract timing information from metadata 420 to determine when an acknowledgement signal should be received from the station 108, when the secondary AP 104b should resent the control message, what should be the content of the control message, etc. Thus, the secondary AP, at this point may wait for the acknowledgement, in optional stage 534.

Optionally, the station 108 may receive the control message, in stage 504. If a control message has been received, the station 108 may send an acknowledgement signal, in stage 506. Thus, the station 108 can receive information from data structure 404, in signal 304a, and may send the optional acknowledgement signal 308.

In some situations, the L2 control message can be a beacon and the response may be an Ready-To-Send (RTS) signal, in signal 308. The stages 504 and 506 are optional because, if the station 108 does not receive the beacon or control message, in stage 504, that stage 504 and the acknowledgement stage 506 would not be performed.

The primary AP 104a can wait for the acknowledgement signal 308, in stage 522. It is possible that the primary AP 104a can resend the L2 control message in some situations. Further, the secondary AP 104b may determine if the acknowledgement signal 308 is sent, in stage 536. If the acknowledgement signal 308 is not received, the method 528 may proceed to stage 538 where the secondary AP 104b may relay the control message, as signal 312, to the station 108. The secondary AP 104b may send signal 312 to the station 108 to relay the data from data structure 404. In other words, the secondary AP 104b can relay the control message 404 based on the message type and timing information. For example, if the L2 control message is a beacon, the secondary AP 104b may resend the beacon soon after the original beacon from the primary AP 104a in the short inter frame space (SIFS), as shown in FIG. 3B. If a different control message is sent, the secondary AP 104b may relay the signal 312 at a different time or with different urgency.

The station 108 can receive the control message from the secondary AP 104b, in stage 508. As such, the station 108 can receive signal 312. Once received the station 108 can acknowledge the reception of the control message 312 either to the primary AP 104a or the secondary AP 104b, in stage 510. Thus, the station 108 can send signal 316a and/or 316b to the primary AP 104a and/or to the secondary AP 104b. The acknowledgement message 316 may be a RTS or other signal. The primary AP 104a may then receive the acknowledgement from the station 108, in stage 524. Once received, the AP 104a may then be able to provide downlink data or receive uplink data, in signals 334.

Figure 6A:
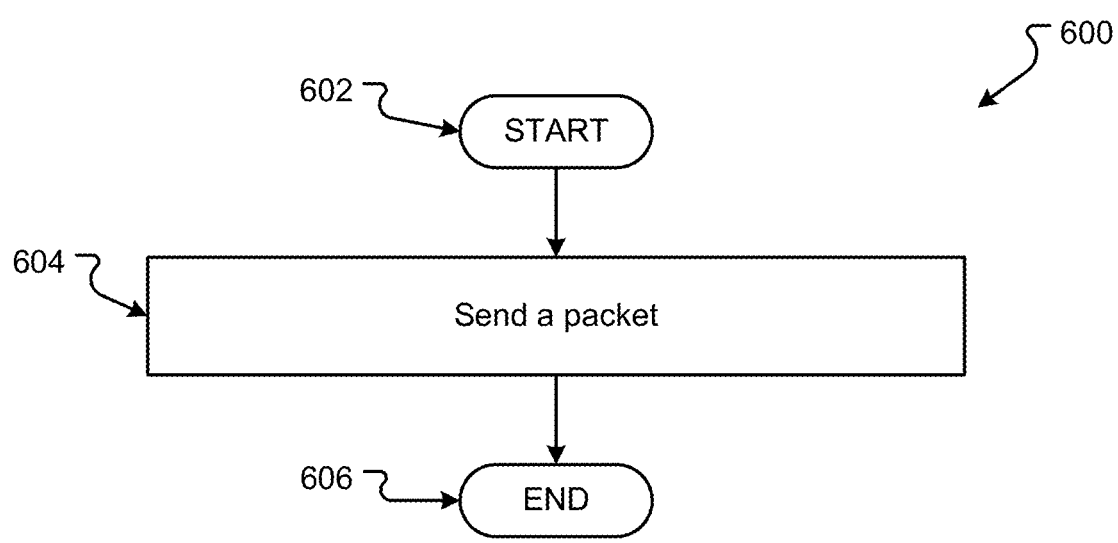
FIG. 6A illustrates a process for managing data packets, as conducted at a STA, in accordance with aspects of the current disclosure.
Figure 6B:
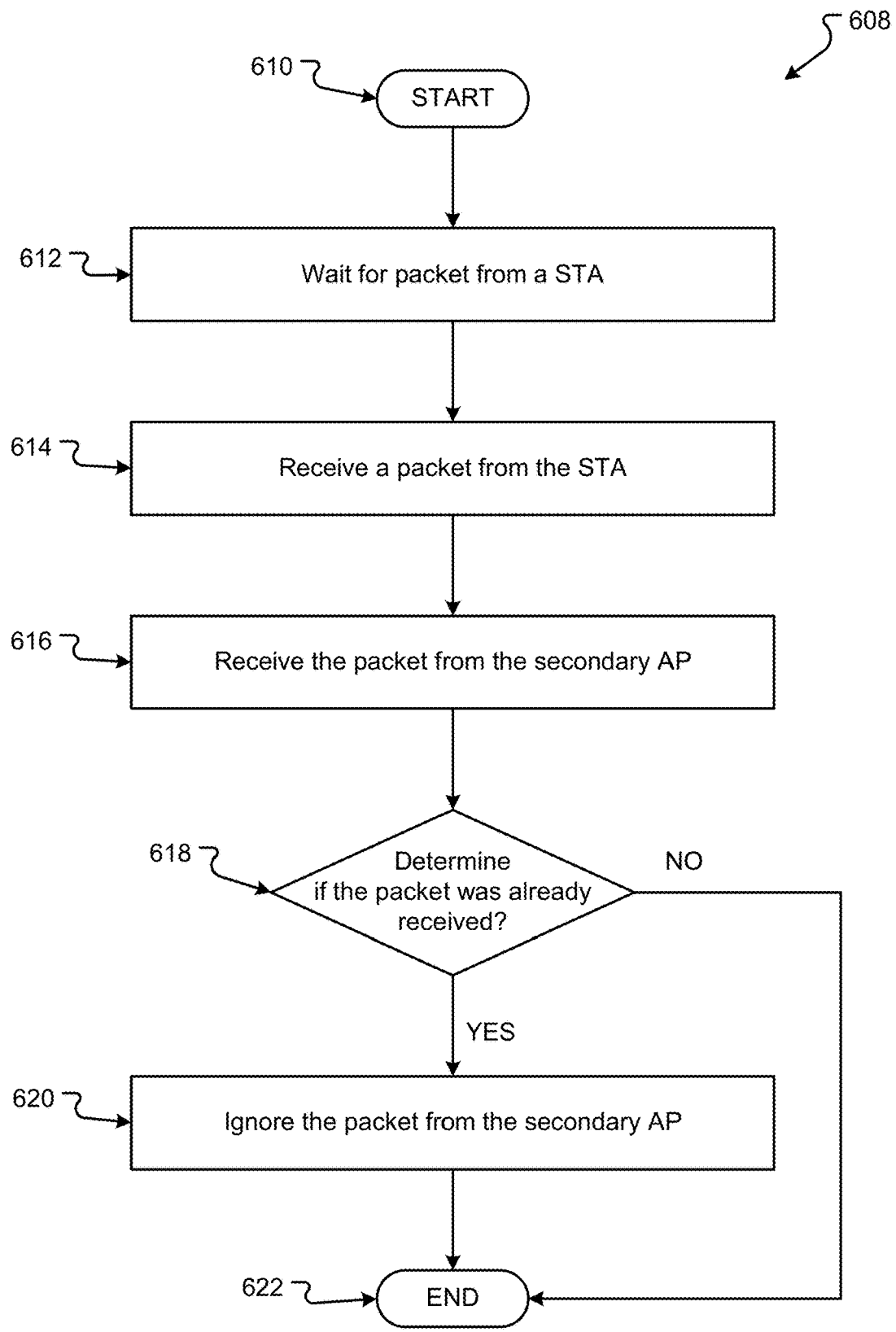
FIG. 6B illustrates a process for managing data packets, as conducted at a primary AP, in accordance with aspects of the current disclosure.
Figure 6C:
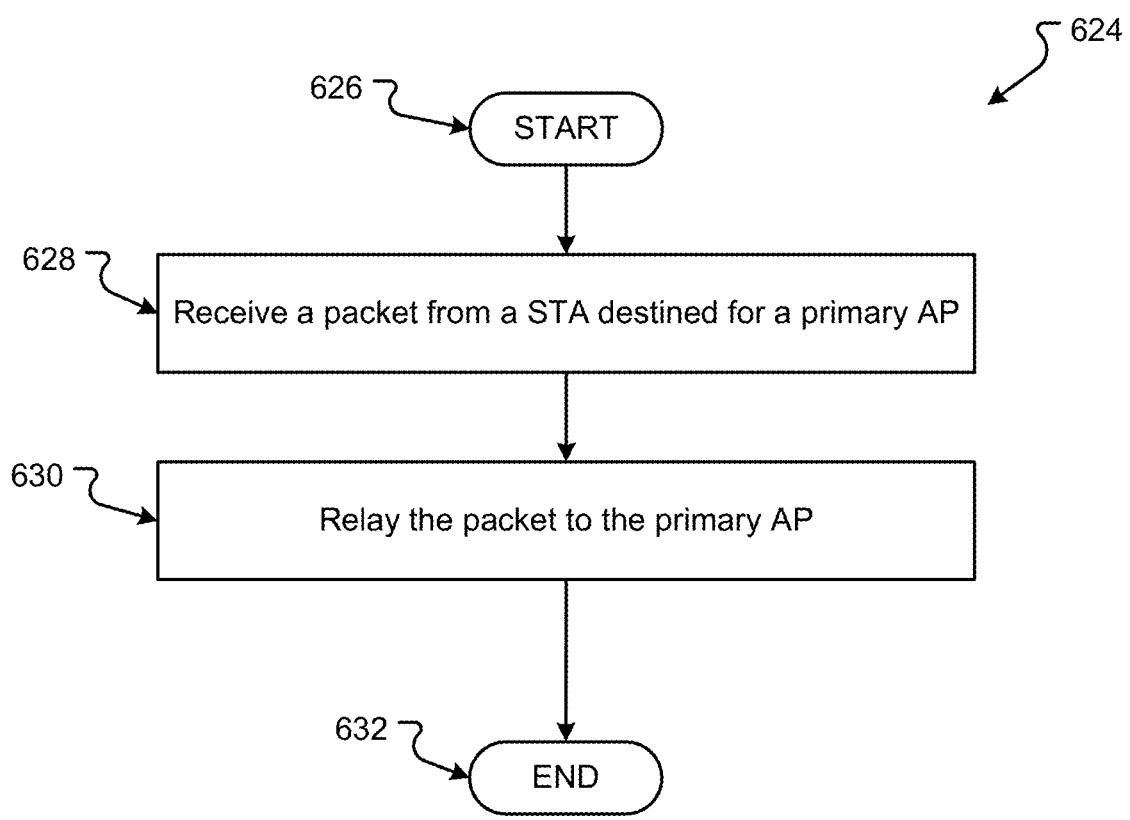
FIG. 6C illustrates a process for managing data packets, as conducted at a secondary AP, in accordance with aspects of the current disclosure.

An embodiment of methods 600, 608, 624 for resending data packets may be as shown in FIGS. 6A, 6B, and 6C. In the situations where the station 108 is sending data to the AP 104, method 600 may be performed by the station 108. Likewise, the method 608 may be performed by the primary AP 104a, and method 624 may be performed by the secondary AP 104b. The methods will be described herein together.

The method 600 starts with a start operation 604 and ends with an end operation 606. The method 600 can include more or fewer stages or can arrange the order of the stages differently than those shown in FIG. 6. The method 600 can be executed as a set of computer-executable instructions, executed by a computer system or processing component, and be encoded or stored on a storage medium. Further, the method 600 can be executed by a gate or other hardware device or component in an ASIC, a FPGA, or other type of hardware device. Hereinafter, the method 600 shall be explained with reference to the systems, components, modules, software, data structures, etc. described herein.

Method 608 shown in FIG. 6B may be as conducted by the primary AP 104a. Generally, the method 608 starts with a start operation 604 and ends with an end operation 622. The method 608 can include more or fewer stages or can arrange the order of the stages differently than those shown in FIG. 6. The method 608 can be executed as a set of computer-executable instructions, executed by a computer system or processing component, and be encoded or stored on a storage medium. Further, the method 608 can be executed by a gate or other hardware device or component in an ASIC, a FPGA, or other type of hardware device. Hereinafter, the method 608 shall be explained with reference to the systems, components, modules, software, data structures, etc. described herein.

The method 624 as shown in FIG. 6C may be as conducted by the secondary AP 104b. Generally, the method 624 starts with a start operation 604 and ends with an end operation 632. The method 624 can include more or fewer stages or can arrange the order of the stages differently than those shown in FIG. 6. The method 624 can be executed as a set of computer-executable instructions, executed by a computer system or processing component, and be encoded or stored on a storage medium. Further, the method 624 can be executed by a gate or other hardware device or component in an ASIC, a FPGA, or other type of hardware device. Hereinafter, the method 624 shall be explained with reference to the systems, components, modules, software, data structures, etc. described herein.

A STA 108 can send a packet or transmission of data, in stage 604. For example, STA 108 may send signal 316a and/or signal 316b to the primary AP 104a and/or the secondary AP 104b. The UL packet can contain data that is to be transmitted from the AP 104 through the router 101 onto a recipient. The packet of data may be timed to be sent during transmission of the RU as previously managed by the beacon, RTS, etc. as described in conjunction with FIGS. 5A through 5C.

Primary AP 104a can wait for the packet of data, in optional stage 612. The stage 612 is optional because the packet may not arrive at the primary AP 104a. The AP 104a may wait for some period of time associated with the transmission of the RU as established during the exchange of control messages, as described in conjunction with FIGS. 5A through 5C. The primary AP 104a can then receive the packet of data from the STA 108, in optional stage 608. The data may then be transmitted, as previously understood, to a recipient.

The secondary AP 104b can also receive a packet of data from the STA 108, in stage 628. The secondary AP 104b can receive signal 316b which may be the signal from the STA 108 transmitted to the primary AP 104a, but received concurrently at the secondary AP 104b. With the secondary AP 104b having received the control messages, the secondary AP 104b is aware of which RU the STA 106 will us for UL transmissions. The secondary AP 104b can then listen for and receive the UL data, and the secondary AP 104b can the relay the packet of data back to the primary AP 104a, in stage 630. Here, the relayer 204, of the secondary AP 104b, can receive the packet of data and relay that data, in signal 320a, back to the primary AP 104a.

The primary AP 104a can receive the packet of data from the secondary AP 104b, in stage 616. As such, the relay receiver 208 of the primary AP 104a can receive the packet sent by the secondary AP 104b, in signal 320. At this point, the primary AP 104a may have received the packet of data both from the STA 108, in stage 608, and from the secondary AP 104b, in stage 616. As such, the relay receiver 208, of the primary AP 104a, can determine if the packet received from the secondary AP 104b was already received form the STA 108, in stage 618. The primary AP 104a can check data, metadata or other information about the signals 316 and 320, sent from STA 108 and the secondary AP 104b, to determine if the signals 316 and 320 are the same. For example, an identifier for each the packets may be compared to determine if the two signals transmitted to the primary AP 104a are the same.

If the packet was already received, the method 608 may proceed YES to stage 620 where the packet from the secondary AP 104b is ignored. If the packet was not already received from the STA 108, the method 608 may proceed NO to end operation 620 where the packet received from the secondary AP 104b is used to send on to the recipient through the router 101.

Before relaying control messages, a discovery process 700 may be conducted to associate primary APs 104a with secondary APs 104b as shown in FIG. 7. Method 700 shown in FIG. 7 may be conducted by the a primary AP 104a and/or a secondary AP 104b. Generally, the method 700 starts with a start operation 704 and ends with an end operation 724. The method 700 can include more or fewer stages or can arrange the order of the stages differently than those shown in FIG. 7. The method 700 can be executed as a set of computer-executable instructions, executed by a computer system or processing component, and be encoded or stored on a storage medium. Further, the method 700 can be executed by a gate or other hardware device or component in an ASIC, a FPGA, or other type of hardware device. Hereinafter, the method 700 shall be explained with reference to the systems, components, modules, software, data structures, etc. described herein.

An AP 104a can send a request to discover secondary APs 104b, in stage 708. The discovery message can be sent to other APs 104b-104d in the BSS 102. The message can include an identifier 408 for the AP 104a, a list of STA IDs 412 in communication with the AP 104a, and/or other information.

Based on the list of STAs 108, the other APs 104b-104d can determine if the STAs 108 identified in the list of STA IDs 412 also communicate with the APs 104b-104d, in stage 712. The other APs 104b-104d can scan for signals sent from the STAs 108. A Received Signal Strength Indicator (RSSI) may be compared to a threshold. If the RSSIs are above the threshold, then the other AP 104b-104d can determine that the other AP 104b-104d can communicate with the STAs 108 in the list of STA IDs 412.

Then, the AP 104a and the APs 104b-104d that are in communication with the STAs 108 in the list of STA IDs 412 can exchange information, in stage 716. The exchange of information can include providing the STA ID 412, the RSSI information associated with the STAs 108 in communication with the other AP 104b-104d, etc. Then, the AP 104a can determine which other AP 104b-104d should function as a secondary AP 104b. The AP 104a may then send and store an association of the primary AP 104a with the secondary AP 104b for each of the STA 108, in stage 720. This association can include for each STA 108, which AP 104 will function as the primary AP 104a and which will function as the secondary AP 104b. Further, the communication addresses for the primary AP 104a and secondary AP 104b can also be stored and associated with the STAs 108 to allow for communication of control messages and/or UL or DL data as described in conjunction with FIGS. 5A-6C.

Figure 8:
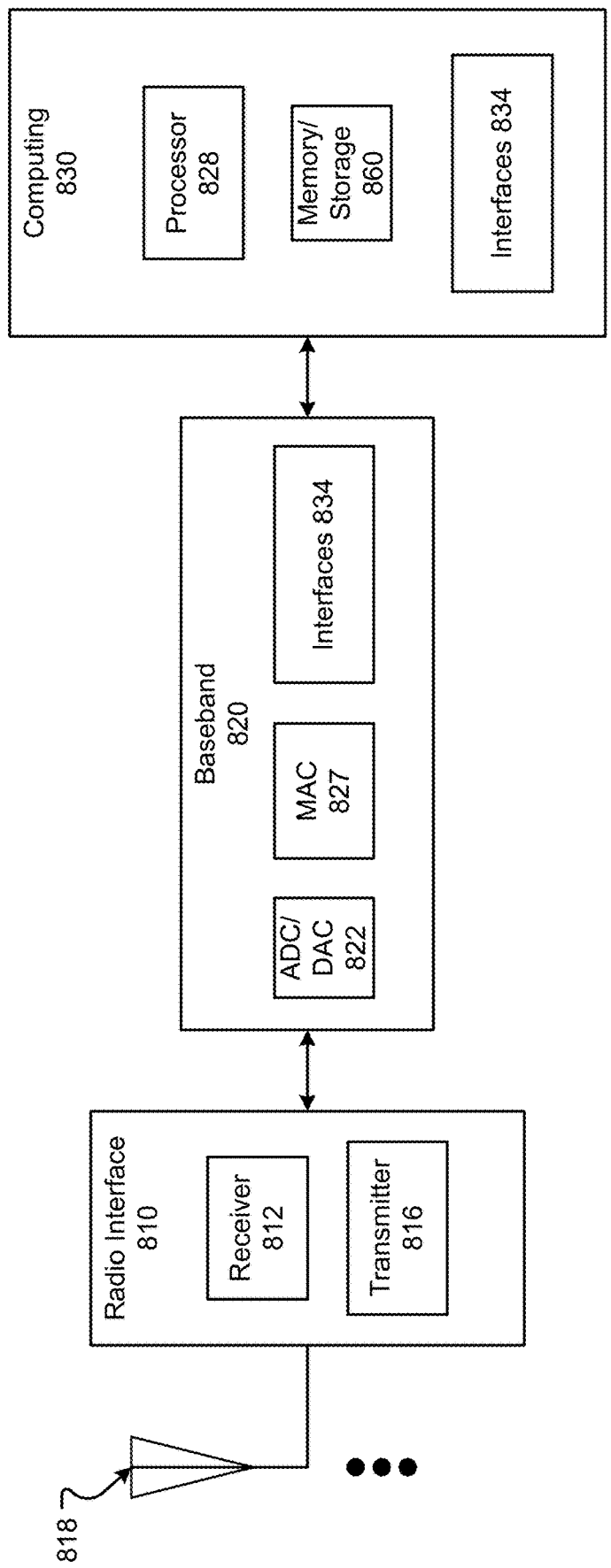
FIG. 8 illustrates an embodiment of a station or access point in accordance with aspects of the current disclosure.

FIG. 8 illustrates an embodiment of a communications device 800 that may implement one or more of APs 104, controllers 101, and/or STAs 106 of FIG. 1. In various embodiments, device 800 may comprise a logic circuit. The logic circuit may include physical circuits to perform operations described for one or more of APs 104, controllers 101, and STAs of FIG. 1, for example. As shown in FIG. 8, device 800 may include one or more of, but is not limited to, a radio interface 810, baseband circuitry 820, and/or computing platform 830.

The device 800 may implement some or all of the structures and/or operations for one or more of APs 104, controllers 101, and/or STAs 106 of FIG. 1, storage medium 860, and logic circuit in a single computing entity, such as entirely within a single device. Alternatively, the device 800 may distribute portions of the structure and/or operations using a distributed system architecture, such as a client-server architecture, a peer-to-peer architecture, a master-slave architecture, etc.

An radio interface 810, which may also include an analog front end (AFE), may include a component or combination of components adapted for transmitting and/or receiving single-carrier or multi-carrier modulated signals (e.g., including Complementary Code Keying (CCK), orthogonal frequency division multiplexing (OFDM), and/or Single-Carrier Frequency Division Multiple Access (SC-FDMA) symbols) although the configurations are not limited to any specific over-the-air interface or modulation scheme. The radio interface 810 may include, for example, a receiver 812 and/or a transmitter 816. Radio interface 810 may include bias controls, a crystal oscillator, and/or one or more antennas 818. In additional or alternative configurations, the radio interface 810 may use oscillators and/or one or more filters, as desired.

Baseband circuitry 820 may communicate with radio interface 810 to process, receive, and/or transmit signals and may include, for example, an Analog-To-Digital Converter (ADC) for down converting received signals with a Digital-To-Analog Converter (DAC) 822 for up converting signals for transmission. Further, baseband circuitry 820 may include a baseband or PHYsical layer (PHY) processing circuit for the PHY link layer processing of respective receive/transmit signals. Baseband circuitry 820 may include, for example, a Medium Access Control (MAC) processing circuit 827 for MAC/data link layer processing. Baseband circuitry 820 may include a memory controller for communicating with MAC processing circuit 827 and/or a computing platform 830, for example, via one or more interfaces 834.

In some configurations, PHY processing circuit may include a frame construction and/or detection module, in combination with additional circuitry such as a buffer memory, to construct and/or deconstruct communication frames. Alternatively or in addition, MAC processing circuit 827 may share processing for certain of these functions or perform these processes independent of PHY processing circuit. In some configurations, MAC and PHY processing may be integrated into a single circuit.

The computing platform 830 may provide computing functionality for the device 800. As shown, the computing platform 830 may include a processing component 828. In addition to, or alternatively of, the baseband circuitry 820, the device 800 may execute processing operations or logic for one or more of APs 104, controllers 101, and/or STAs 106, storage medium 860, and logic circuits using the memory components 860. The processing component 828 (and/or PHY and/or MAC 827) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, Application Specific Integrated Circuits (ASIC), Programmable Logic Devices (PLD), Digital Signal Processors (DSP), Field Programmable Gate Array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, Application Program Interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 830 may further include other platform components. Other platform components include common computing elements, such as one or more processors, multi-core processors, co-processors, memory units, chipsets, controllers, peripherals, interfaces, oscillators, timing devices, video cards, audio cards, multimedia Input/Output (I/O) components (e.g., digital displays), power supplies, and so forth. Examples of memory units 860 may include without limitation various types of computer readable and machine readable storage media in the form of one or more higher speed memory units, such as Read-Only Memory (ROM), Random-Access Memory (RAM), Dynamic RAM (DRAM), Double-Data-Rate DRAM (DDRAM), Synchronous DRAM (SDRAM), Static RAM (SRAM), Programmable ROM (PROM), Erasable Programmable ROM (EPROM), Electrically Erasable Programmable ROM (EEPROM), flash memory, polymer memory such as ferroelectric polymer memory, ovonic memory, phase change or ferroelectric memory, Silicon-Oxide-Nitride-Oxide-Silicon (SONOS) memory, magnetic or optical cards, an array of devices such as Redundant Array of Independent Disks (RAID) drives, solid state memory devices (e.g., Universal Serial Bus (USB) memory, Solid State Drives (SSD) and any other type of storage media suitable for storing information.

Device 800 may be, for example, an ultra-mobile device, a mobile device, a fixed device, a Machine-To-Machine (M2M) device, a Personal Digital Assistant (PDA), a mobile computing device, a smart phone, a telephone, a digital telephone, a cellular telephone, user equipment, eBook readers, a handset, a one-way pager, a two-way pager, a messaging device, a computer, a Personal Computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, subscriber station, mobile subscriber center, radio network controller, router, hub, gateway, bridge, switch, machine, or combination thereof. Accordingly, functions and/or specific configurations of device 800 described herein, may be included or omitted in various embodiments of device 800, as suitably desired.

Embodiments of device 800 may be implemented using Single Input Single Output (SISO) architectures. However, certain implementations may include multiple antennas (e.g., antennas 818) for transmission and/or reception using adaptive antenna techniques for beamforming or Spatial Division Multiple Access (SDMA) and/or using MIMO communication techniques.

The components and features of device 800 may be implemented using any combination of discrete circuitry, Application Specific Integrated Circuits (ASICs), logic gates and/or single chip architectures. Further, the features of device 800 may be implemented using microcontrollers, programmable logic arrays and/or microprocessors or any combination of the foregoing where suitably appropriate. It is noted that hardware, firmware, and/or software elements may be collectively or individually referred to herein as "logic," "circuit," or "processor."

The device in FIG. 8 can also contain a security module (not shown). This security module can contain information regarding, but not limited to, security parameters required to connect the device to another device or other available networks or network devices, and can include Wireless Equivalent Privacy (WEP) or Wi-Fi Protected Access (WPA) security access keys, network keys, etc., as discussed.

Another module that the device in FIG. 8 can include is a network access unit (not shown). The network access unit can be used for connecting with another network device. In one example, connectivity can include synchronization between devices. In another example, the network access unit can work as a medium which provides support for communication with other stations. In yet another example, the network access unit can work in conjunction with at least the MAC circuitry 827. The network access unit can also work and interact with one or more of the modules/components described herein.

It should be appreciated that the exemplary device 800 shown in the block diagram of FIG. 8 may represent one functionally descriptive example of many potential implementations. Accordingly, division, omission, or inclusion of block functions depicted in the accompanying figures does not infer that the hardware components, circuits, software and/or elements for implementing these functions would be necessarily be divided, omitted, or included in embodiments.

What is claimed is:
1. A method comprising:
   receiving, at a secondary Access Point (AP) from a primary AP, a control message for a Station (STA), wherein the primary AP and the secondary AP both cover the STA, and wherein the primary AP sends the control message to both the secondary AP and the STA;

listening, by the secondary AP, for an acknowledgement from the STA to the primary AP confirming receipt of the control message;
resending, by the secondary AP in response to no acknowledgement from the STA to the primary AP confirming the receipt of the control message, the control message to the STA;
extracting, by the secondary AP from the control message, timing information comprising a schedule indicating of when the STA is expected to send data; and
listening, by the secondary AP, for the data at the schedule.

2. The method of claim 1, wherein the control message is one of a beacon, a Target Wait Time (TWT) response, a trigger frame, or a Block Acknowledgement (BA).

3. The method of claim 2, wherein a timing of resending the control message is based on a type of control message.

4. The method of claim 3, wherein the timing is part of metadata provided by the primary AP with the control message send to the secondary AP.

5. The method of claim 4, wherein the secondary AP receives the control message from the primary AP over a wired connection to the primary AP.

6. The method of claim 1, further comprising: waiting for an acknowledgement from the STA before resending the control message to the STA.

7. The method of claim 1, further comprising: receiving, at the secondary AP, an Uplink (UL) data transmission from the STA.

8. The method of claim 7, further comprising: relaying the UL data transmission to the primary AP.

9. The method of claim 8, further comprising:
determining that the primary AP and the secondary AP can communicate with the STA; and
storing an association of the primary AP and the second AP for redundant sending of control messages to the STA.

10. The method of claim 9, wherein the association comprises an address of the secondary AP to send the control message.

11. An Access Point A (AP) comprising:
a memory;
a processor in communication with the memory, the processor operable to:
receive, at the AP from another AP, a control message for a station (STA), wherein the AP and the another AP both cover the STA, and wherein the another AP sends the control message to both the AP and the STA;
listen for an acknowledgement from the STA to the another AP confirming receipt of the control message;
resend, in response to no acknowledgement from the STA to the another AP confirming the receipt of the control message, the control message to the STA over the radio;
extract, from the control message, timing information comprising a schedule indicating of when the STA is expected to send data to the secondary AP; and
listen for the data at the schedule.

12. The AP of claim 11, wherein the acknowledgement is forwarded to the another AP.

13. The AP of claim 11, wherein the control message comprises metadata associated with the control message.

14. The AP of claim 13, wherein the metadata comprises another timing information for when the AP is to resend the control message to the STA.

15. The AP of claim 11, wherein the AP is determined based on a Received Signal Strength Indicator (RSSI) associated with the STA as determined by the AP.

16. A basic service set comprising:
a primary Access Point (AP) operable to:
wirelessly connect with a Station (STA) over a radio;
determine a secondary AP in communication with the STA;
send a control message to the STA over the radio;
relay the control message to the secondary AP; and
wait for an acknowledgement of the control message;
the secondary AP operable to:
receive, from the primary AP, the control message for the STA;
listen for an acknowledgement from the STA to the primary AP confirming receipt of the control message;
resend, in response to no acknowledgement from the STA to the primary AP confirming the receipt of the control message, the control message to the STA;
extract, from the control message, timing information comprising a schedule indicating of when the STA is expected to send data; and
listen for the data from the STA at the schedule.

17. The basic service set of claim 16, wherein the control message comprises metadata associated with the control message, and wherein the metadata comprises another timing information for when the secondary AP is to resend the control message to the STA.

18. The basic service set of claim 17, wherein timing of resending the control message is based on a type of control message.

19. The basic service set of claim 16, wherein the secondary AP is further operable to:
receive an Uplink (UL) data transmission from the STA; and
relay the UL data transmission to the primary AP.

20. The basic service set of claim 16, wherein the secondary AP is determined based on a Received Signal Strength Indicator (RSSI) associated with the STA as determined by the secondary AP.

* * * * *